United States Patent [19]
Winyall et al.

[11] 3,803,046
[45] Apr. 9, 1974

[54] PROCESS FOR PREPARING SILICA ORGANOGEL

[75] Inventors: Milton E. Winyall, Ellicott City; Ellsworth G. Acker, Baltimore, both of Md.

[73] Assignee: W. R. Grace & Co., New York, N.Y.

[22] Filed: June 28, 1972

[21] Appl. No.: 267,033

[52] U.S. Cl. ......... 252/317, 106/287 S, 106/308 Q, 423/338
[51] Int. Cl. .................... B01j 13/00, C01b 33/14
[58] Field of Search ..... 252/317; 106/287 S, 308 Q; 423/338

[56] References Cited
UNITED STATES PATENTS

| | | | |
|---|---|---|---|
| 1,773,273 | 8/1930 | Miller | 423/338 |
| 2,284,248 | 5/1942 | Baker et al. | 252/317 UX |
| 2,396,051 | 3/1946 | Laus | 252/317 X |
| 2,516,967 | 8/1950 | Elam | 252/317 X |
| 2,681,314 | 6/1954 | Skinner et al. | 252/317 X |
| 2,807,588 | 9/1957 | White et al. | 252/317 |

Primary Examiner—Richard D. Lovering

[57] ABSTRACT

An improved and rapid process for purifying a silica hydrogel of soluble contaminants while converting the silica hydrogel to a silica organogel, which comprises reducing the hydrogel to a controlled particle size range and thereafter treating the hydrogel in a continuous three-step operation. Treatment involves first dewatering a hydrogel slurry, washing the resulting hydrogel with an acidic or acidified aqueous or organic solvent, followed by washing with an organic solvent which may also be acidified. All treatment steps are preferably carried out on a moving belt maintained under a vacuum. The silica gels are useful in a host of applications, such as flatting agents in coating compositions and thickeners and fillers in diverse compositions.

12 Claims, No Drawings

PROCESS FOR PREPARING SILICA ORGANOGEL

This invention relates to hydrogels and, in particular, to an improved process for removing soluble impurities from silica hydrogels and simultaneously converting these hydrogels to organogels.

Silica gels are versatile materials which are useful in a host of applications, such as flatting agents in coating compositions and thickeners and fillers in diverse compositions. They are generally prepared from gel-forming ingredients which initially form a silica hydrosol which sets to a silica hydrogel. The hydrogel is processed to remove impurities and is then dried at an elevated temperature. The resulting gel is characterized by a high pore volume and high surface area and is inert in the environment in which it performs its function.

Conventionally, the process of preparing the gel involves mixing an alkali metal silicate and a mineral acid or carbon dioxide to form a silica hydrosol. Illustrative silicates include sodium silicate, sodium metasilicate and potassium silicate, of which sodium silicate is preferred because of its favorable economic factor. Suitable mineral acids include sulphuric, hydrochloric and phosphoric acids, of which sulphuric acid is generally employed. Carbon dioxide may also be used. The resulting hydrosol is allowed to set to a hydrogel. Next, if the hydrogel is not in a slurry form, it is broken into pieces and washed with aqueous acid solutions to remove undesirable impurities and impart specific properties. It is dried and then ground, or simultaneously dried and ground, to a desirable particle size, depending on the use to which it is to be put.

The hydrosol is generally allowed to set in a series of stainless steel tubs or on a moving belt, following which the resulting hydrogel is broken into particles having an average width ranging between about two and three inches, if not in a slurry form. The normal gradation of sizes ranges from about 0.001 inch to about three inches. The hydrogel particles are then washed with an acidified water solution so as to remove remaining alkali ions. This washing may, in the instance where the particles are large pieces, comprise a continual flooding of the particles with wash solution for in the range of 30 to 40 hours. When the particles are in a slurry form, the procedure is to batchwise slurry and filter several times until the contaminant anions and cations are removed. The product of these washes is then contacted with an organic solvent which displaces the water so as to decrease silica particle shrinkage on drying.

The general procedure of washing the hydrogel and organic solvent displacement of water requires considerable equipment and space in order to process large amounts of material. In addition, it requires a prolonged period to complete the washing cycle, and the use of more aqueous wash solution in order to reduce the impurities in the hydrogel to a satisfactory level.

It is, therefore, a prime object of this invention to provide a process whereby the conventional practice of washing silica hydrogels and displacing water to form an organogel may be accomplished using minimum equipment, and is carried out at a more rapid rate and without impairing the quality of the product. This objective is preferably achieved by purifying silica hydrogel and converting it to a silica organogel in a continuous three-stage process.

In carrying out the process of this invention, predetermined amounts of carbon dioxide or of a mineral acid, e.g., sulphuric acid, and a soluble alkali metal silicate, e.g., sodium silicate, are mixed to form a silica hydrosol containing between about 3 to 18 percent $SiO_2$. The sodium silicate solution may be any commercial grade having a weight ratio of $SiO_2:Na_2O$ from about 1:1 to 3.4:1, and may also contain about 0.5 to six percent ammonia. The resulting hydrosol, which has a pH ranging between about 1 to 11, depending on the acid used, is deposited onto a continuous moving belt where gelation occurs in about 1 to 10 minutes. The gel sets on the belt as it moves along for a period of between about 20 to 60 minutes.

The hydrogel is discharged from the setting belt and then is passed through a cutter where it is reduced to a particle size of less than 20 mesh. The particle size is preferably that of a silica slurry hydrogel which permits efficient removal of soluble impurities therefrom in the subsequent threatment steps because a greater surface is available for contact with the washing medium and faster mass transfer, due to the smaller particle sizes. In addition, the thickness to which the washing medium must penetrate is less than the conventional larger particles and consequently, the time required to remove the soluble impurities is appreciably reduced.

Optionally, the hydrogel particles, if acid set, may be passed to a tank where they are admixed with water to yield a slurry having a silica content of about six to 12 percent. Ammonia in the form of ammonium hydroxide is then added in an amount sufficient to raise the pH of the slurry about the neutral point, generally in the range of 8.0 to 10. The ammonia is added for the purpose of increasing the pore volume of the silica. This ammonia treatment converts a portion of the linear reinforcing silica to a spheroidal micellular silica. The treatment is necessary for a hydrogel which has been in contact with an acid media and where the silica is to have a pore volume in the range of about 1 to 2.5 cc/g. The ammoniated slurry is heated to approximately 170°F to 190°F, preferably to 180°F, for from about one to 40 hours.

In the next step, the hydrogel or the ammoniated hydrogel, depending on the previous process step, is pumped onto a moving belt which is provided with a vacuum of down to about 1 mm of Hg. on the underside through which liquid components are drawn, and banks of overhead sprays for depositing wash solutions. The degree of vacuum is not critical, with a vacuum in the range of 1 to 300 mm of Hg. found to be suitable. The belt passes sequentially through three or more zones, with the hydrogel receiving a separate treatment in each zone. A vacuum is maintained as the hydrogel moves through each of these zones.

Wash belts range in length from 12 feet to 150 feet. The belt speed is in the range of 1 to 30 feet per minutes. The residence time of washing is preferably in the range of 3 to 24 minutes. The treating zones may be equivalent or unequal in length as desired. This is not critical, since the wash solution composition of a zone may be easily changed by part or all of the overhead sprays of a zone being added to those of another zone if necessary. There is a complete flexibility in the arrangement of the overhead sprays, with the capability of feeding differing solutions to various banks of these overhead sprays. Spray volume and pressure is also variable as necessary.

In the first zone, the hydrogel is partially vacuum dewatered as it moves along the first portion of the belt. Preferably, no wash solution is sprayed on the hydrogel in this zone. When it reaches the second zone, water or acidified water is deposited on the hydrogel bed from a plurality of overhead sprays. An acidified water is preferred, and is sprayed in an amount sufficient to maintain the bed in a saturated condition to assure thorough removal of sodium and sulfate ions. The water contains about 0.5 to 5 percent of acid, usually about 1.5 to 2.5 percent, and is at a temperature of about 100°F to 200°F. Any mineral acid such as sulphuric acid, hydrochloric acid, phosphoric acid or an organic carboxylic acid, is used in the washing medium of the second zone. Suitable organic carboxylic acids are formic acid, acetic acid, oxalic acid, citric acid, tartaric acid, nitrilotriacetic acid and ethylenediaminetetraacetic acid.

The thus treated hydrogel moves to the third zone, where alkali ions are removed and the hydrogel concurrently dewatered, using an organic solvent. This is accomplished by depositing an acidic or acidified organic solvent from a plurality of overhead sprays onto the hydrogel from the second zone in a concentration sufficient to maintain the bed in a saturated condition and thereby sufficient to convert the hydrogel to organogel. The organic solvent is at a temperature of about 40°F to 210°F, preferably 60° to 100°F. As the silica exits this zone, it has been converted to an organogel with most of the water displaced by the organic solvent. This zone may consist of a single organic solvent mixture wash, or may consist of the use of two or more organic solvent mixtures. That is, this zone may be subdivided so that differing organic solvent mixtures can be used. Residual alkali ions not removed in the second zone are removed in this zone, due to the use of an acidic or acidified organic solvent.

Following the washing treatment, the silica organogel is moved to storage or for further processing. It may be dried and then ground using a hammer mill or fluid energy mill, or it may be simultaneously dried and ground using a fluid energy mill as described in U. S. Pat. No. 2,856,268.

The organic solvents which may be used in the third zone include ketones, aldehydes, esters, alcohols, carboxylic acids or compounds containing more than one of these groups. Preferably, the organic solvent should be miscible with water. Very useful solvents are alcohols such as methanol, ethanol, propanol or ethylene glycol; ketones such as acetone, methyl ethyl ketone and diethylketone; aldehydes such as acetaldehyde or formaldehyde; esters such as ethyl acetate, ethyl propionate and methyl propionate and acids such as formic acid and acetic acid. The organic acids which may be used in admixture with the organic solvent include formic acid, acetic acid, propionic acid, ethylenediaminetetracetic acid, nitrilotriacetic acid, citric acid, malic acid, tartaric acid, malonic acid, glutaric acid, oxalic acid and adipic acid. All that is necessary of the organic acid is that it form soluble alkali salts so that these alkali ions can be removed from the silica particles. About 1.5 equivalent of acid is added for each equivalent of $Na_2O$.

The following examples are set out to further amplify the present invention.

EXAMPLES 1-10

The following was conducted in the laboratory, simulating a plant silica washing and organic exchanging belt process.

Silica gel was prepared by mixing a sodium silicate solution containing ammonia (six percent $SiO_2$, two percent $NH_3$) with carbon dioxide gas in a mixing nozzle to a pH 10.7 outlet. The hydrosol was set in four minutes, corresponding to four minutes on a moving belt. The silica gel is then aged 10 more minutes on the belt. The silica was returned to a mixing vessel and aged for 30 minutes with agitation. Carbon dioxide was added to this silica hydrogel slurry to reduce the pH to 9.8. The silica hydrogel was then divided into 10 portions and washed as described in Table 1. The results of the washing and organic exchanging are given as % $Na_2O$, % $SO_4$ and % $H_2O$.

The useful length of a silica washing-organic exchanging belt is 45 feet. This belt moves at a rate of 1 foot/min. There are three zones through which the belt moves, each being of a set length, and consequently the silica being treated for a predetermined time in each zone. The belt is maintained under a vacuum of about 25 mm Hg. during its entire length.

The above 10 silica samples were washed to remove sodium and sulfate ions, and dewatered using the schedule of Table 1. The time schedule for these runs

TABLE 1

| Example | Zone 1 | Zone 2 | Zone 3 | Percent $Na_2O$ | Percent $SO_4$ | Percent $H_2O$ |
|---|---|---|---|---|---|---|
| 1 | Vacuum Dewater | 2,000 cc. 3 pH $H_2SO_4$ | 2,500 cc. acetone 2,500 cc. propionic acid mixture | 0.056 | 0.27 | 1.03 |
| 2 | Vacuum Dewater | 2,000 cc. 3 pH $H_2SO_4$ | 4,000 cc. acetic acid | 0.029 | 0.071 | 2.33 |
| 3 | Vacuum Dewater | 2,000 cc. 3 pH $H_2SO_4$ | 3,000 cc. acetone w/15 g. citric acid 3,000 cc. acetone w/3 g. citric acid | 0.53 | 0.14 | 1.17 |
| 4 | Vacuum Dewater | 2,000 cc. 3 pH $H_2SO_4$ | 3,000 cc. acetone w/15 g. acetic acid 3,000 cc. acetone w/3 g. acetic acid | 0.83 | 0.09 | 0.41 |
| 5 | Vacuum Dewater | 2,000 cc. $H_2O$ | 7,000 cc. acetone w/70 g. acetic acid | 0.36 | 0.05 | 1.03 |
| 6 | Vacuum Dewater | 2,000 cc. $H_2O$ | 3,000 cc. acetone w/30 g. acetic acid 3,000 cc. acetone w/69 g. acetic acid | 0.99 | 0.04 | 0.70 |
| 7 | Vacuum Dewater | 2,000 cc. 3 pH $H_2SO_4$ | 5,000 cc. ethanol w/30 g. acetic acid | 0.42 | 0.08 | 1.74 |
| 8 | Vacuum Dewater | 2,000 cc. 3 pH $H_2SO_4$ | 7,000 cc. ethylene glycol w/20 g. oxalic acid | 0.61 | 0.11 | 1.15 |
| 9 | Vacuum Dewater | 2,000 cc. $H_2O$ | 7,000 cc. ethyl acetate w/40 g. acetic acid | 0.22 | 0.03 | 2.10 |
| 10 | Vacuum Dewater | 2,000 cc. $H_2O$ | 5,000 cc. methyl ethyl ketone w/35 g. citric acid | 0.082 | 0.12 | 0.85 | is Zone 1, 2 minutes; Zone 2, 13 minutes; and Zone 3, 30 minutes. The average filter cake thickness is approximately 0.6 to 0.65 inches.

The values in the table are about average for the cation cationic and anionic contaminants found in commercial grade silica gels. When working with hydrogel chunks using a flooding washing and exchanging technique, the time is excessively long, such as 30 hours. A considerable process advantage here also is the concurrent removal of alkali ions and conversion to an organogel in the third zone by using an acidic organic solvent or an acidified organic solution. This results in a significant reduction in process time.

What is claimed is:

1. A process for removing soluble impurities from a silica hydrogel and concurrently forming a silica organogel, which comprises providing silica hydrogel particles having a particle size of up to about 20 mesh, providing at least three zones, each zone operating under a vacuum throughout the duration thereof, vacuum dewatering said particles in a first zone, treating the dewatered particles with an acidic aqueous solution in a second zone, the amount of acidic aqueous solution being sufficient to maintain said particles in a saturated condition; treating the resulting particles with an acidic organic solution in a third zone, the amount of acidic organic solution being sufficient to maintain said particles in a saturated condition; and recovering a silica organogel substantially free of soluble impurities.

2. A process according to claim 1 wherein said vacuum consists of a pressure of about 1 to 300 mm. of Hg.

3. A process according to claim 2 wherein the acidified water in said second zone contains 0.1 to 5 percent of sulphuric acid.

4. A process according to claim 2 wherein the acidified water in said second zone contains 0.5 to 5 percent of an organic carboxylic acid.

5. A process according to claim 2 wherein the organic solution is selected from the group consisting of acetone, methyl ethyl ketone, ethyl alcohol, methyl alcohol and ethyl acetate.

6. A process according to claim 5 wherein the organic solvent is acetone.

7. A process according to claim 5 wherein the organic solvent is ethyl acetate.

8. A process according to claim 5 wherein said organic solvent is ethanol.

9. A process according to claim 4 wherein said carboxylic acid is selected from the group consisting of formic acid, acetic acid, oxalic acid, citric acid, tartaric acid, nitrilotriacetic acid and ethylenediamine tetraacetic acid.

10. A process according to claim 1 wherein said silica hydrogel particles move on a belt through each of said zones, said belt being maintained under a vacuum.

11. A process according to claim 5 wherein said organic solution contains a carboxylic acid selected from the group consisting of formic acid, acetic acid, oxalic acid, citric acid, tartaric acid, nitrilotriacetic acid and ethylenediamine tetraacetic acid.

12. A process according to claim 1 wherein said silica organogel is simultaneously dried and ground in a fluid energy mill.

* * * * *